United States Patent [19]

Driggers

[11] Patent Number: 4,876,785

[45] Date of Patent: Oct. 31, 1989

[54] METHOD FOR INSTALLING AND REMOVING A FIREPLACE INSERT

[76] Inventor: Roberts H. Driggers, 302 Covewood Tr., Asheville, N.C. 28805

[21] Appl. No.: 89,235

[22] Filed: Aug. 25, 1987

[51] Int. Cl.[4] .............................................. B23P 19/04
[52] U.S. Cl. ...................................... 29/426.3; 29/822; 414/659; 414/749
[58] Field of Search ................... 29/426.3, 426.5, 822; 414/749, 659, 661, 662, 663; 193/35 TE

[56] References Cited

U.S. PATENT DOCUMENTS

| | | | |
|---|---|---|---|
| 2,599,052 | 6/1952 | Forman | 414/659 |
| 3,181,714 | 5/1965 | Kappen | 414/749 |
| 3,374,878 | 3/1968 | Kornylak | 193/35 TE |
| 3,380,606 | 4/1968 | Trumpore | 414/661 |
| 4,459,732 | 7/1984 | Driggers | 29/426.3 |
| 4,701,097 | 10/1987 | Sturtz | 414/659 X |

*Primary Examiner*—Timothy V. Eley
*Assistant Examiner*—Frances Chin
*Attorney, Agent, or Firm*—Bailey & Hardaway

[57] ABSTRACT

An apparatus and process are described for removing and reinserting a fireplace insert into a hearth cavity for purposes of cleaning the cavity and its associated chimney, and for initially installing a fireplace insert. The apparatus includes a pair of parallel rails with a track disposed along the inward sides, a tray with wheels for moving along the track, and rollers for conveying an insert onto the tray, and support means for adjusting the height of the rails.

3 Claims, 5 Drawing Sheets

METHOD FOR INSTALLING AND REMOVING A FIREPLACE INSERT

BACKGROUND OF THE INVENTION

This invention relates generally to the art of conveyors and more particularly to the art of a conveyor for transporting a hearth insert from carrier vehicle to hearth cavity, installing the insert in the cavity and subsequently removing the insert from the cavity for reasons of maintenance.

In recent years, fireplace inserts which generally conform to the confines of a hearth cavity have come into widespread use in order to enhance the heating capabilities of conventional fireplaces. Such inserts have been quite effective for their intended use, but, in addition to proper installation, require significant maintenance in order to avoid the risks of fire associated with the residue and deposits emitted from such inserts and accumulated with the chimney area.

Current model fireplace inserts typically weigh between 400 and 800 pounds. As is apparent from the weight and mass of such inserts, the process of initially conveying the insert to the hearth cavity and positioning it properly represents a task of considerable proportion. Further, in order to properly maintain a fireplace insert and the chimney with which it communicates a task usually performed by a chimney sweep, the insert must be removed from the hearth cavity after approximately 3,000 to 4,000 hours of operation. The process of removing the insert from a raised hearth cavity and reinserting it after cleaning is equally problematic since the insert fits into the hearth cavity with very close tolerances.

Further complicating these processes is the consideration that most raised hearths have a depth which is not sufficient to retain an insert once it has been removed from the hearth cavity. Additionally, while a hearth is normally constructed of sturdy materials, such as fire brick, slate or marble, such sturdiness is not sufficient for the rigors associated with the movement of a 400 to 800 pound hearth insert.

The removal of hearth inserts within the prior art has thus required the efforts of several people, and significant problems must be overcome before the maintenancing thereof is completed. This amount of manpower is not consistent with the chimney sweep art wherein ordinarily a single individual is involved in the maintenancing of chimneys and the hearth inserts associated therewith.

Many specialized conveyors have existed within the prior art for solving a variety of problems. An example of a specifically designed conveyor is disclosed in U.S. Pat. No. 3,374,879 to Kornylak which confronts the problems associated with dock side and on board vessel conveying. Disclosed therein are separated conveyors which telescope one within the other for the purpose of permitting loading and unloading of a vessel.

Another such conveying apparatus is disclosed in U.S. Pat. No. 3,887,083 to Baxter, wherein a conveyor with adjustable supports is utilized for placing a housing module upon a site foundation. A similar device is shown in U.S. Pat. No. 3,958,705 also to Baxter.

U.S. Pat. No. 3,869,031 to Coleman discloses an inclined ramp conveyor which may be leveled by positioning on bracket members.

U.S. Pat. No. 1,423,320 to Haas discloses rollers within an oven to assist in insertion and removal of articles from the oven.

In addition, U.S. Pat. No. 4,459,732 to Driggers confronts the problems associated with hearth insert removal and reinsertion.

Thus, while many specially developed conveying devices exist within the prior art, no such device has ever been designed to address the problems of initially installing a fireplace insert as well as removing and reinserting the insert at the proper time for reasons of maintenance.

SUMMARY OF THE INVENTION

It is thus an object of this invention to provide a novel apparatus to assist in removing a fireplace insert from a hearth cavity and from the proximity of the hearth and, subsequently, reinserting it.

It is a more particular object of this invention to provide a novel apparatus to assist in the initial installation of a fireplace insert into a hearth cavity.

It is a further object of this invention to provide a novel process whereby a single individual can initially install and/or remove and reinsert a fireplace insert into a hearth cavity.

These as well as other objects are accomplished by an apparatus for removing and reinserting a fireplace insert into a hearth cavity, the apparatus comprising a pair of parallel steel rails, each having a roller at its distal end and each attached to the other at proximal ends by a steel bar and near distal ends by a steel bar, a track disposed along the inward side of each of the rails, a tray with wheels for moving along the tracks and with rollers for conveying the insert onto the tray, and support means for adjusting the height of the proximal end of the rails to conform to the height of the hearth.

The process of this invention is carried out by positioning the distal ends of the rails of the apparatus on the hearth opposite the hearth cavity, adjusting the height of the rails to conform to the height of the heath, elevating the lower surface of the insert and positioning the ends of the rails under the insert, loading the insert onto the tray and rolling the tray to the proximal end of the rails.

DETAILED DESCRIPTION

In accordance with this invention, it has been found that the apparatus of this invention may be utilized by a single individual to assist in removing and reinserting a fireplace insert into a hearth cavity for the purpose of cleaning the cavity and its associated chimney. Whether working at floor level or on a raised hearth, positioning the apparatus can be done quickly. In addition, even an 800 pound insert can be moved easily due to the smooth operation of the apparatus. Although constructed of heavy-duty steel, the apparatus weighs only about 28 pounds and is readily manageable by a single individual. Use of the instant invention reduces the risks of back injury and property damage and provides an easy, quick and safe way to clean a chimney, lessening the frustrations associated with this task. These as well as other advantages will be apparent from the following description and reference to the figures of drawing.

Figure 1:
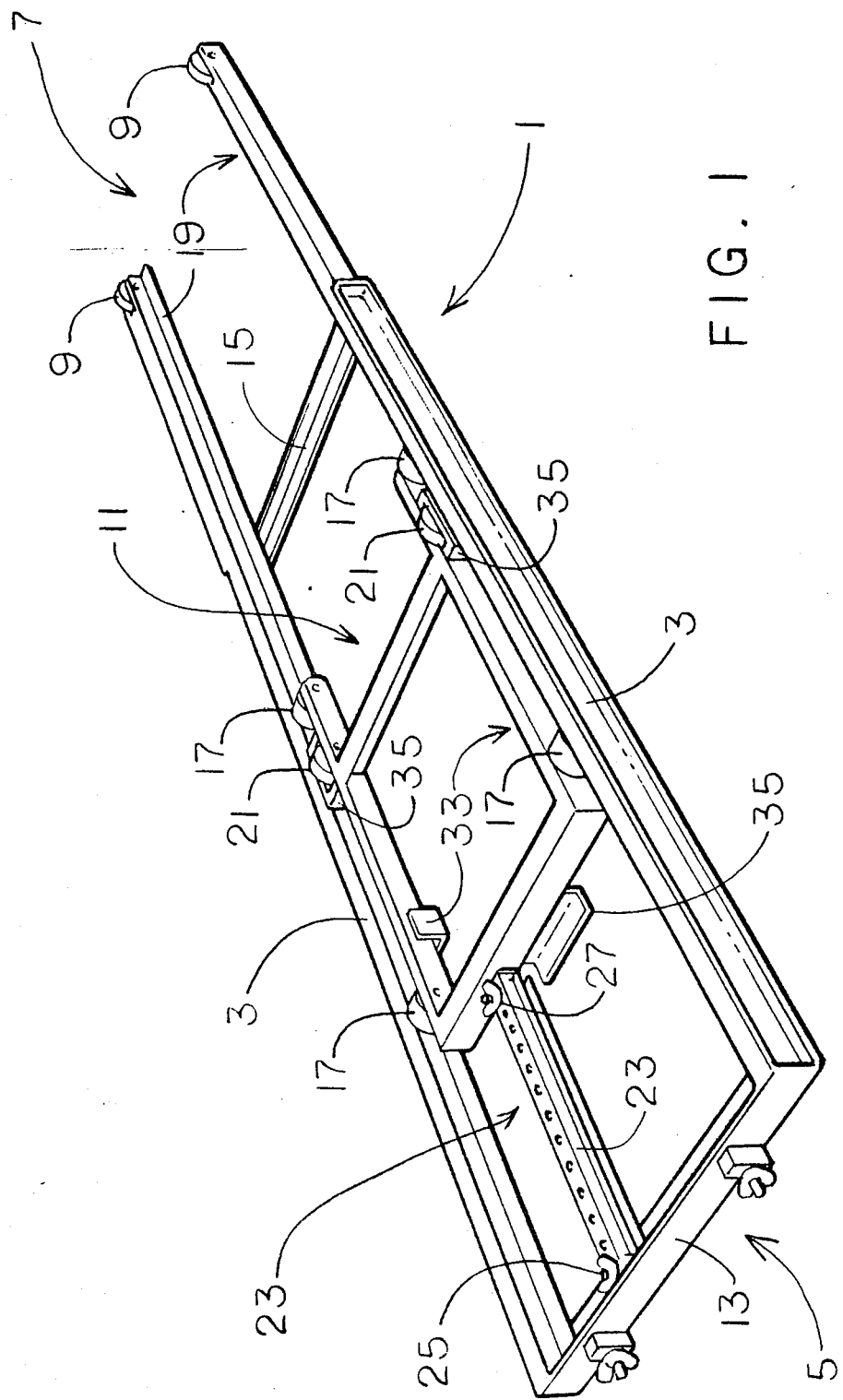
FIG. 1 of the drawings is a perspective view of the apparatus in accordance with the invention showing the slidable tray secured to the frame by the support means in stored position.

FIG. 1 of the drawings illustrates the apparatus of the invention 1, including a pair of parallel rails 3 having proximal end 5 and distal end 7. Rollers 9 are positioned at the distal end 7 of each rail 3 in order to assist in conveying the weight of the insert when it is loaded onto slidable tray 11. Apparatus 1 further includes bar 13 which connects rails 3 at proximal end 5, and bar 15 which connects and supports rails 3 near distal end 7. Slidable tray 11 includes wheels 17 for moving along tracks 19 disposed along the inward sides of rails 3 and also rollers 21, the top edge of which extends above tray 11 for conveying the insert onto tray 11. The top of tray 11 is higher than the surface of rails 3, keeping the insert (not shown) from contacting rails 3 as tray 11 moves smoothly to proximal end 5. Also in FIG. 1, support means 23 is shown in stored position, bolted to bar 13 at 25 and to tray 11 at 27, and is on the same plane as rails 3. Thus, when apparatus 1 is not in use, support means 23 is not only out of the way but also serves to secure tray 11 from otherwise sliding along tracks 19.

Figure 2:
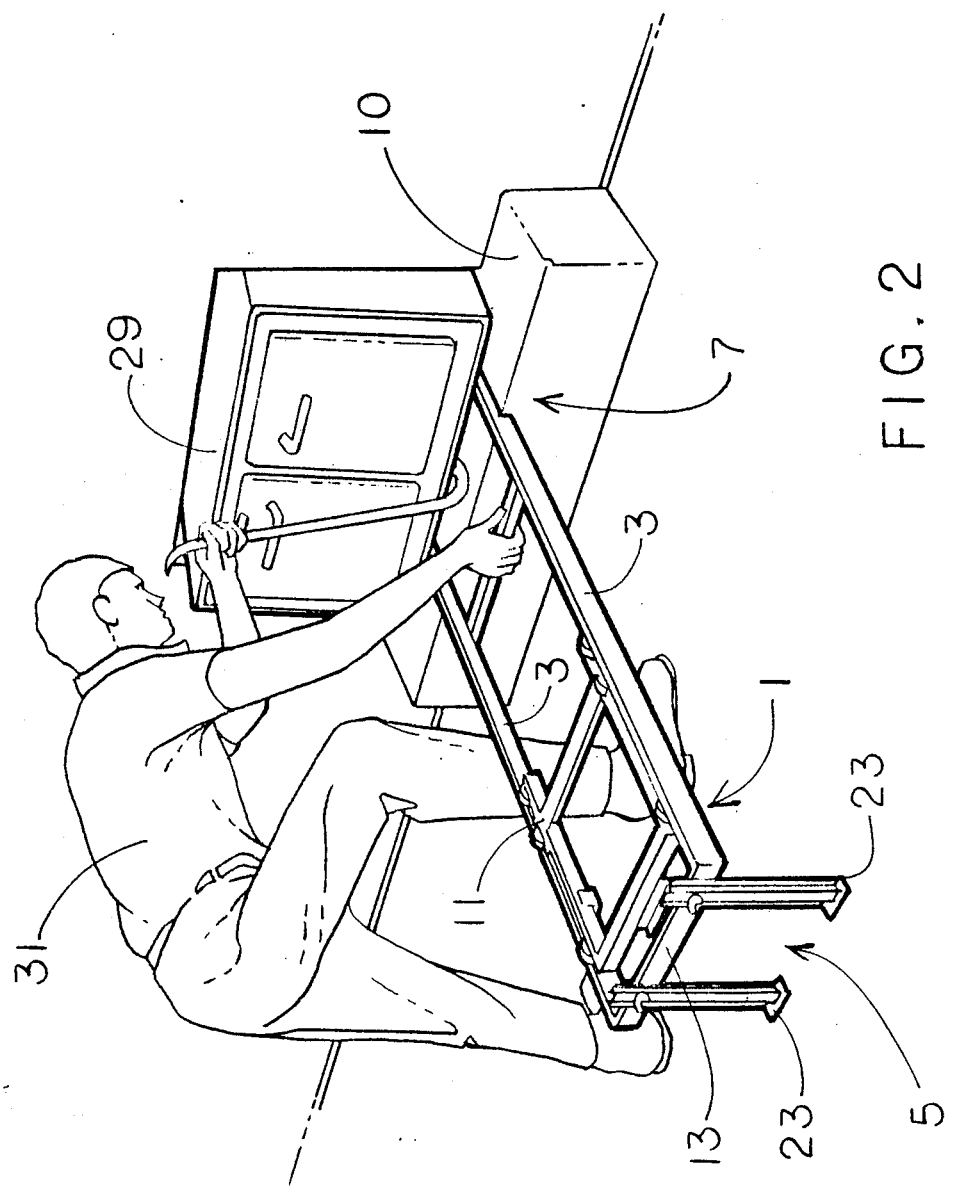
FIG. 2 of the drawings is a perspective view of the apparatus in accordance with the invention showing the support means secured in position supporting the proximal end of the apparatus and showing the distal end of the rails positioned under the fireplace insert.

In FIG. 2 of the drawings, support means 23 are secured in working position at proximal end 5, bolted to bar 13. They serve to level apparatus 1 by supporting proximal end 5 at the same height as distal end 7 resting on hearth 10. Support means 23 extend above rails 3 to become a backstop preventing insert 29 from moving beyond proximal end 5.

Figure 3:
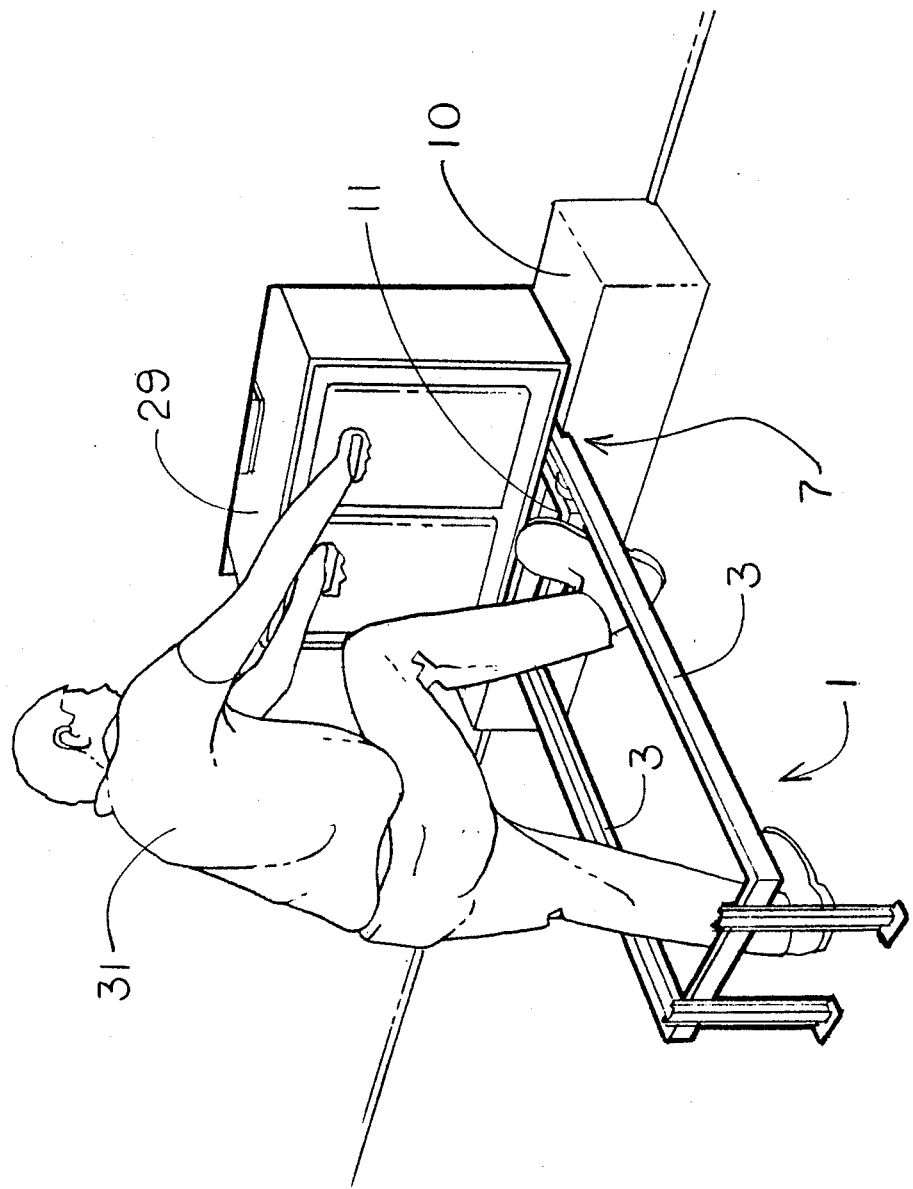
FIG. 3 of the drawings is a side view of the apparatus in accordance with the invention illustrating how the insert is loaded onto the tray.

FIG. 3 of the drawings illustrates how insert 29 is loaded onto distal end 7 of rails 3 and subsequently onto slidable tray 11 and also indicates a further advantage of the design of apparatus 1. The chimney sweep 31 is able to stand between rails 3, directly in front of the heavy insert 29, at the time of loading. This allows chimney sweep 31 to brace himself against tray 11, giving him additional personal stability as well as securing the position of tray 11.

Figure 4:
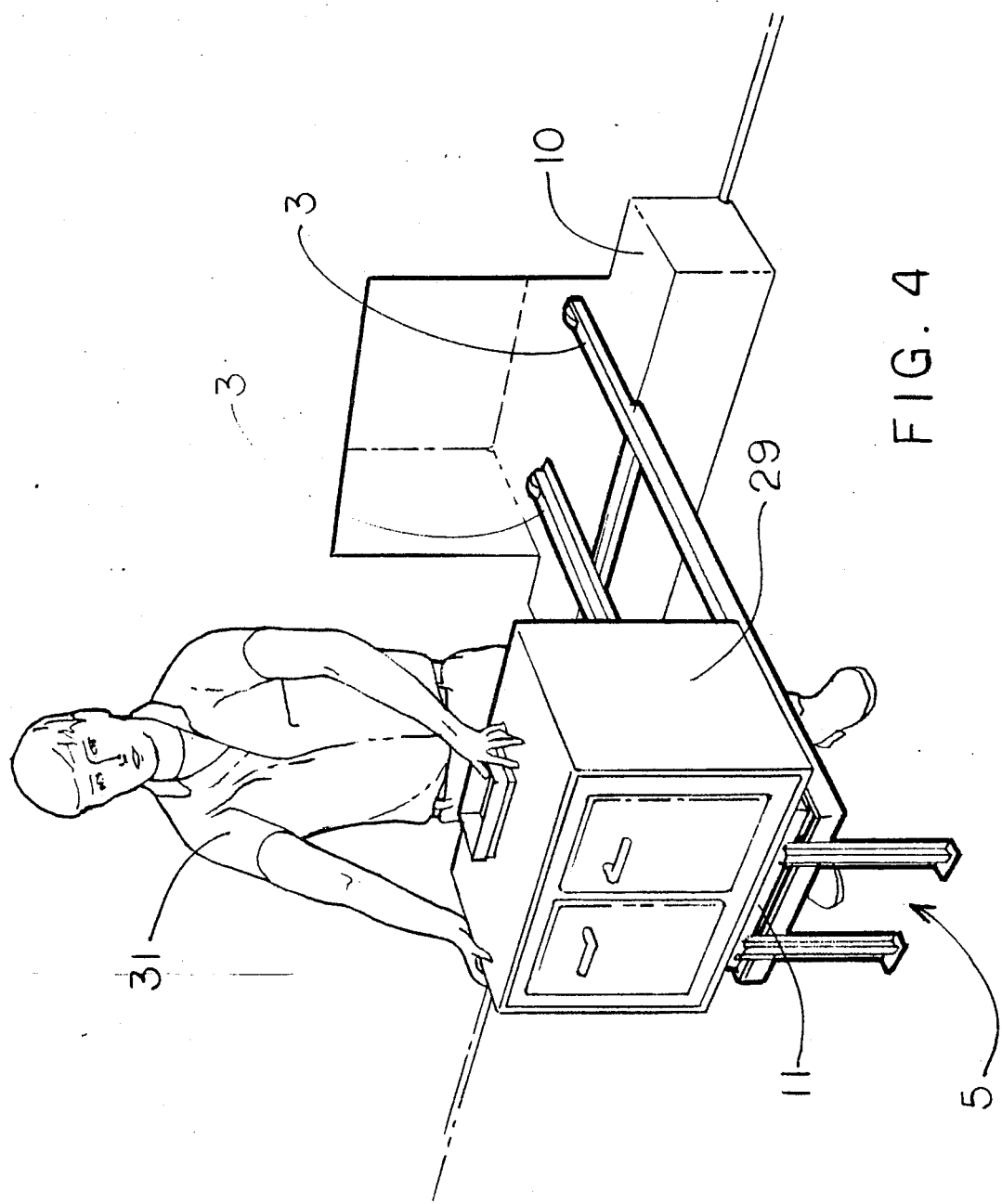
FIG. 4 of the drawings is a perspective view of the apparatus in accordance with the invention showing the insert resting on the tray and being moved to the proximal end of the rails.

In FIG. 4 of the drawings, insert 29 is shown resting on tray 11 and being moved to the proximal end 5 of rails 3.

Figure 5:
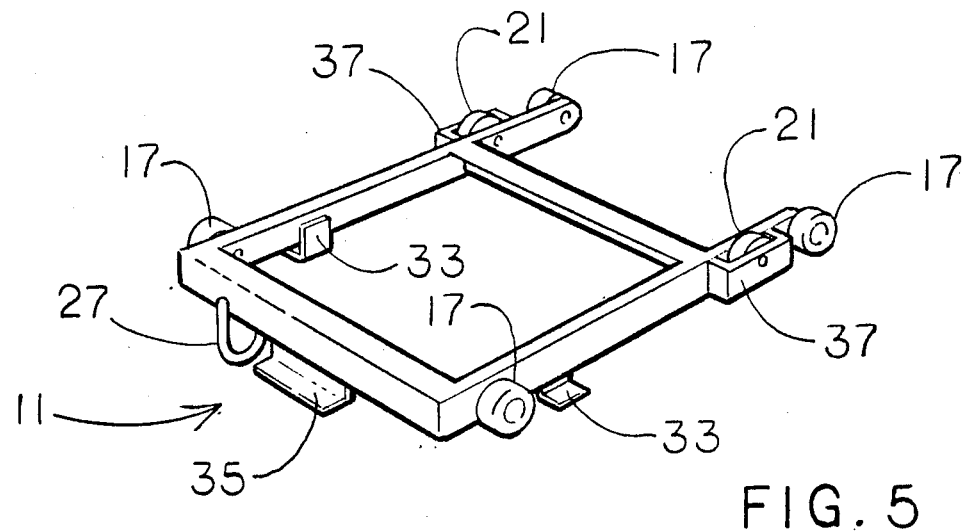
FIG. 5 of the drawings is an enlarged perspective view of the tray showing stops at the sides and back and a rear post for use in securing its position.

Details of tray 11 are illustrated in FIG. 5 of the drawings. Stops 33 come in contact with support bar 15 (see FIG. 1) preventing tray 11 from rolling beyond distal end 7 of rails 3. In addition, stops 33 extend under rails 3 keeping tray 11 in the same vertical plane as rails 3. Stop 35 comes in contact with connecting bar 13 (see FIG. 1) to assist in preventing tray 11 from rolling beyond proximal end 5. The raised position of rollers 21 and their associated housings 37 are also apparent in FIG. 5.

Figure 6:
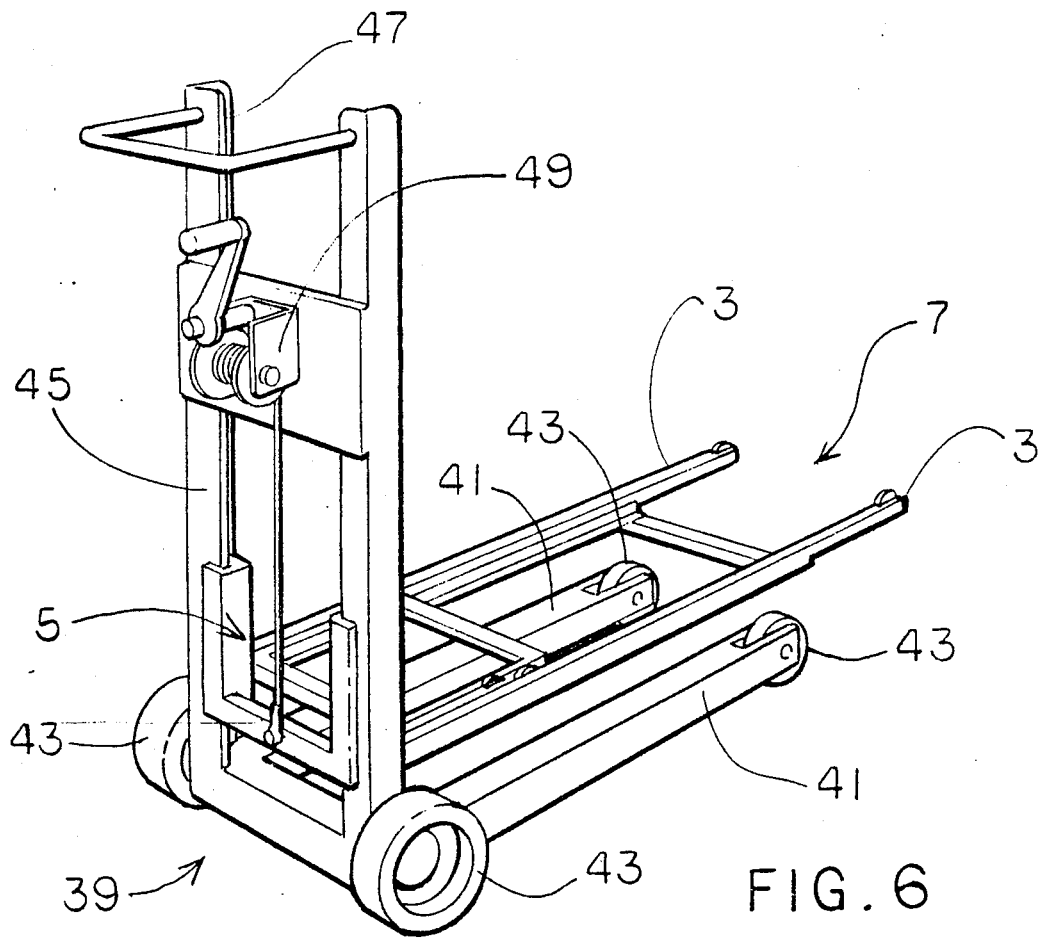
FIG. 6 of the drawings is an alternative embodiment of the apparatus in accordance with the invention showing a roller device which conveys a fireplace insert from a carrier vehicle to a hearth cavity for insertion.

In FIG. 6 of the drawings, an alternative embodiment of the apparatus in accordance with the invention is illustrated. The roller device 39 conveys a fireplace insert from a carrier vehicle to a hearth cavity for insertion. The device is easily manipulated by a single individual to roll across the ground or floor and is adaptable to the height of the floor of any carrier vehicle as well as to the height of any heath.

The roller device 39 also assists in removing the insert from the proximity of the hearth and subsequently reinserting it in the cavity for purposes of maintaining the cavity and its associated chimney. The roller device 39 comprises a pair of bottommost parallel rails 41 having wheels 43 for rolling the apparatus along the ground or floor. Wheels 43 can be locked in position by a locking means (not shown) at the time of accepting or relinquishing a fireplace insert as a safety precaution. Vertical member 45 joins and braces rails 41 at their proximal ends and houses in troughs 47 the proximal end 5 of topmost parallel rails 3. Attached to the top of vertical member 45 as well as to the proximal end 5 of topmost rails 3 is adjustable vertical support means 49. Support means 49 levels rails 3 after distal end 7 is positioned upon an elevated surface (vehicle floor or hearth). In one preferred form of this invention, the adjustable vertical support means 49 comprises a pulley system, as shown in FIG. 6. Alternatively, adjustable vertical support means 49 comprises a scissor mechanism for altering the height of rails 3.

The process of utilizing the apparatus in accordance with the invention is carried out by positioning on a hearth 10 opposite a hearth cavity the distal end 7 of the apparatus (parallel rails 3), and then adjusting the height of the proximal end 5 of the rails 3 to conform to the height of the hearth. The lower surface of the fireplace insert 29 is then slightly elevated, preferably carried out by use of a crow bar. Upon elevation, the distal end 7 of rails 3 is positioned under the insert 29. Tray 11 is then rolled along tracks 19 toward the distal end 7 of rails 3. The insert 29 is loaded onto tray 11 and tray 11 is rolled to proximal end 5 of rails 3.

The process of utilizing the stated alternative embodiment of the apparatus in accordance with the invention further includes positioning the roller device 39 in close proximity to a carrier vehicle (not shown) such that distal end 7 of rails 3 rests upon the vehicle floor. Vertical support means 49, a pulley system in one preferred form of the invention, is then adjusted to level rails 3. In another preferred form of the instant invention, a scissor mechanism (not shown) is used for leveling rails 3, and it is understood that any suitable adjusting means may be utilized for this purpose. After loading the insert in the same manner as described above, the roller device 39 is moved to the proximity of the hearth cavity. Adjustable vertical support means 49 then aligns the height of rails 3 with the height of hearth 10 so that insert 29 may be positioned in the hearth cavity. Means are provided (not shown) for locking in a desired position both the topmost rails and the wheels of the bottommost rails.

Various modifications or alternative embodiments exist with the apparatus of this invention and may be utilized as long as the overall apparatus performs its basic function and remains operable by a single individual.

It is thus seen that the instant invention provides a novel apparatus to assist in removing a fireplace insert from a hearth cavity and from the proximity of the hearth and, subsequently, reinserting it. More particularly, it is seen that the instant invention provides a novel apparatus to assist in the initial installation of a fireplace insert into a hearth cavity. It is further seen that this invention provides a novel process whereby a single individual can initially install and/or remove and reinsert a fireplace insert into a hearth cavity. As many variations are apparent to one of skill in the art from a reading of the above specification, such variations are within the spirit and scope of the instant invention as defined by the following appended claims.

That which is claimed is:

1. A process for initially installing a fireplace insert into a hearth cavity, said process including steps for the subsequent removal and reinsertion of said fireplace insert for the purpose of cleaning said cavity and its associated chimney, comprising the steps of:

positioning an apparatus for moving said fireplace insert to the proximity of said hearth cavity, said apparatus comprising:

a roller device having a vertically movable topmost pair of parallel rails and a stationary bottommost pair of parallel rails, each with a proximal end and a distal end;

said bottommost pair of parallel rails having wheels appropriately positioned for moving said device along the ground or floor;

said roller device also having a vertical member joining and bracing said parts of parallel rails at said proximal ends;

an adjustable vertical support means for said topmost pair of parallel rails comprising a pulley system;

said topmost rails each having a roller at said distal end;

said topmost rails attached and supported by a bar at said proximal end and a bar near said distal end;

a track disposed along the inward side of said topmost rails; and a tray with wheels for moving along said tracks, said tray also including rollers for conveying said insert onto said tray;

adjusting said vertical support means to conform the height of said topmost parallel rails to a lower surface of said fireplace insert;

elevating the lower surface of said insert;

positioning said distal end of said rails under said insert;

rolling said tray along said tracks toward said distal end of said rails;

loading said insert onto said tray;

rolling said tray to said proximal end of said rails;

moving roller device to proximity of said hearth cavity;

adjusting said vertical support means to conform the height of said topmost rails to the height of a hearth adjacent said hearth cavity; and conveying said insert to said hearth cavity.

2. The process according to claim 1 further comprising means for preventing a conveyed article from moving past said proximal end of said topmost rails.

3. The process according to claim 2 wherein said vertical member extends above and below the proximal end of said topmost rails both to support said rails and to act as a backstop to prevent a conveyed article from moving past said proximal end of said topmost rails.

* * * * *